(12) United States Patent
Pederson

(10) Patent No.: US 7,320,240 B2
(45) Date of Patent: Jan. 22, 2008

(54) OIL GROOVES FORMED IN A RACE

(75) Inventor: Jack E. Pederson, Saline, MI (US)

(73) Assignee: GKN Sinter Metals, Auburn, MI (US)

( * ) Notice: Subject to any disclaimer, the term of this patent is extended or adjusted under 35 U.S.C. 154(b) by 0 days.

(21) Appl. No.: 11/225,696

(22) Filed: Sep. 13, 2005

(65) Prior Publication Data

US 2006/0162416 A1 Jul. 27, 2006

Related U.S. Application Data

(60) Provisional application No. 60/609,502, filed on Sep. 13, 2004.

(51) Int. Cl.
*B21J 13/02* (2006.01)

(52) U.S. Cl. ........................ 72/355.6; 72/355.2; 72/416; 72/471

(58) Field of Classification Search ............... 72/355.6, 72/355.2, 340, 374, 376, 359, 416, 412, 354.6, 72/353.2
See application file for complete search history.

(56) References Cited

FOREIGN PATENT DOCUMENTS

JP 06142815 A * 5/1994

* cited by examiner

*Primary Examiner*—Derris H. Banks
*Assistant Examiner*—Debra M Wolfe
(74) *Attorney, Agent, or Firm*—Woodcock Washburn LLP

(57) ABSTRACT

A device, such as an inner race of a torque converter's overrunning clutch, is formed by powder metallurgy. The race includes oil grooves and chamfers formed in each face by forging. The oil grooves on the first face open onto the chamfer. The chamfer on the second face is interrupted at the oil grooves such that each oil groove opens onto the diametral surface. A forge assembly for forming the race includes a die assembly including a discontinuous lower chamfer tool, an upper punch including groove tools and a continuous chamfer tool, and a lower punch including groove tools and radially extending teeth disposed at the oil grooves and capable of extending into the gaps of the lower chamfer tool. A method for forming the race includes employing the die assembly to forge the oil grooves and chamfers into the preform and remove flash by conventional grinding processes.

24 Claims, 6 Drawing Sheets

OIL GROOVES FORMED IN A RACE

CROSS-REFERENCE TO RELATED APPLICATION

This application claims priority under 35 U.S.C. § 119(e) to U.S. provisional application No. 60/609,502, filed Sep. 13, 2004, the contents of which is incorporated by reference herein in its entirety.

FIELD OF THE INVENTION

This invention relates to powder metallurgy, and more particularly, to a device and an apparatus and method for forming the device via powder metallurgy.

BACKGROUND OF THE INVENTION

Powder metallurgy processes may be used to make metal components. One type of powder metallurgy process includes compressing a chosen powder composition in a press to form a preform, sintering the green preform, and then forging the sintered preform. For example, a net shape forging of a race for an overrunning or one-way clutch may be formed by such a powder metallurgy process.

To diminish the surface roughness of the forged race, the outer diametral surface and opposing faces typically undergo grinding processes. Machinery for performing conventional OD grinding and face grinding, which machinery and techniques are well known, are automated and effective.

Generally, an inner race of an overrunning clutch may include oil grooves in the surface to direct oil to the rollers, balls, sprags, or other elements. For example, oil grooves formed in the faces of an inner race may extend inwardly from its periphery.

SUMMARY OF THE INVENTION

A method for forming an oil groove in a face surface of a race is provided. Preferably, the method includes the steps of: a) providing the race preform comprising an outer diametral surface and opposing first and second faces extending radially inwardly from the outer diametral surface; b) providing a die assembly; c) disposing the race preform in said die assembly between said upper punch and said lower punch; and d) forging the race preform in the die between the punches such that oil grooves are formed in the first face of the race. Preferably, the die assembly includes: a die including a circumferential sidewall and an inwardly extending, arcuate lower chamfer tool formed on a lower portion of said die for forming a chamfer between an outer diametral surface and a lower face of the race preform, the lower chamfer tool including gaps in its circumference such that the lower chamfer tool is discontinuous; a lower punch including oil groove tools extending upwardly thereon for forming oil grooves in the second face of the race and teeth extending radially outwardly and insertable into the gaps in the lower chamfer tool; and an upper punch disposed opposite said lower punch.

The upper punch may include an upper chamfer tool circumferentially disposed thereon for forming a chamfer between the outer diametral surface and the second face of the race and oil groove tools formed thereon such that the forging step forms oil grooves in the second face of the race.

A die assembly for forming a race preform into a forging is also provided. The die assembly (in some embodiments) includes a die; a lower punch; and an upper punch disposed opposite said lower punch.

The die includes a circumferential sidewall and an inwardly extending, arcuate lower chamfer tool formed on a lower portion of said die for forming a chamfer between an outer diametral surface and a lower face of the race preform. The lower chamfer tool includes gaps in its circumference such that the lower chamfer tool is discontinuous. The lower punch includes oil groove tools extending upwardly thereon for forming oil grooves in the second face of the race and teeth extending radially outwardly and insertable into the gaps in the lower chamfer tool. The upper punch includes (i) an upper chamfer tool circumferentially disposed thereon for forming a chamfer between the outer diametral surface and the second face of the race and (ii) oil groove tools formed thereon such that the forging step forms oil grooves in the second face of the race. Preferably, the upper oil groove tools merge into said upper chamfer tool.

The lower chamfer tooling is formed on the die such that it facilitates sliding of the forging from the lower chamfer tool. Gaps are formed between the upper punch and the die and the lower punch and the die, whereby flash is formed in said gaps during forging. The flash at the upper punch has an outside diameter that is substantially equal in magnitude to the inside diameter of the die and the flash at the lower punch face has a diameter that is substantially equal in magnitude to an inner diameter of the lower chamfer tool, whereby an outside diameter grinding operation and a surface grinding operation remove said flash. The oil groove tooling of the lower punch extends outwardly to proximate an inside surface of the die, whereby, after removal of flash from the forging, the oil grooves open onto the diametral surface of the race.

A race for an overrunning clutch made by the method and die is also provided.

DETAILED DESCRIPTION OF ILLUSTRATIVE EMBODIMENTS

Figure 1:
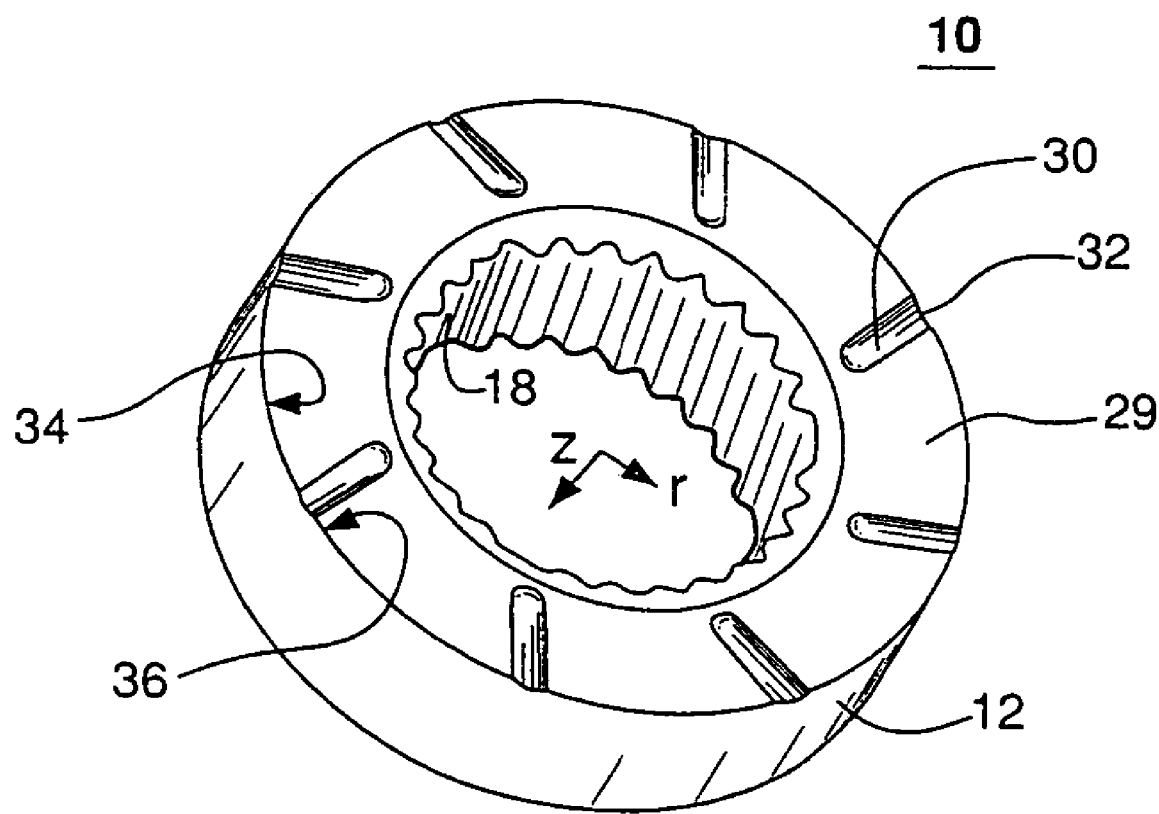
FIG. 1 is a perspective view of a portion of a race formed in general illustration of an aspect of the present invention.
Figure 8:
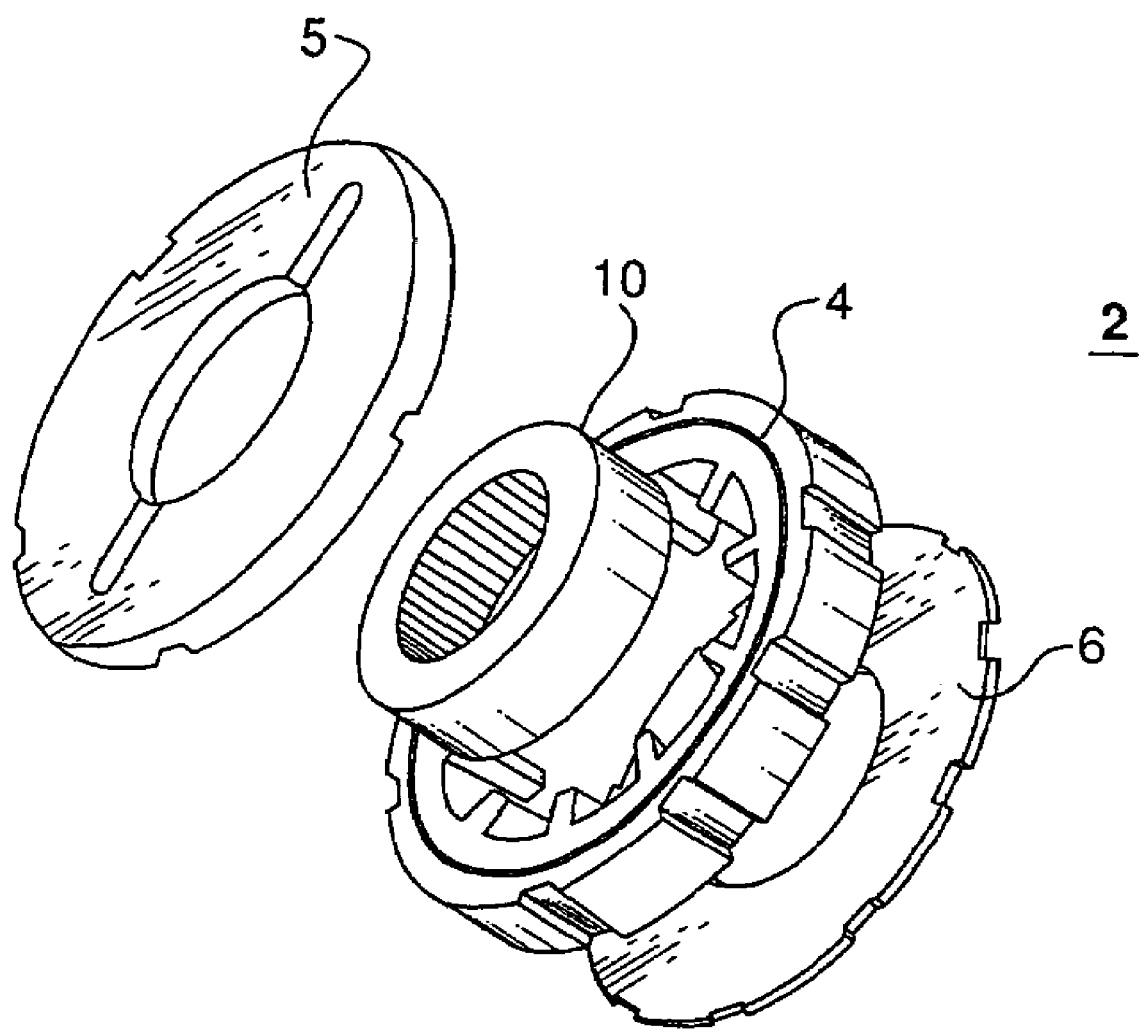
FIG. 8 is an exploded perspective view of a device of the type employing the race shown in FIG. 1.

An inner race 10 includes a diametral face 12, an interior surface having plural gear teeth 18, and opposing first and second faces 19 and 29, respectively, as best illustrated in FIG. 1. FIG. 8 illustrates a one-way clutch 2 of the type employed in a torque converter or torque multiplying fluid coupling between an engine (not shown) and an automatic transmission (not shown), with some elements (such as rollers) omitted for clarity. Clutch 2 includes inner race 10, plural rollers (not shown) disposed on diametral face 12 of inner race 10, an outer race 4 that has pockets and springs (not shown) for retaining and positioning the rollers, and first and second end plates 5 and 6. For the embodiment in which inner race 10 is employed as part of clutch 2 in a torque converter, the stator of the torque converter (not shown) may engage gear teeth 18.

Figure 2A:
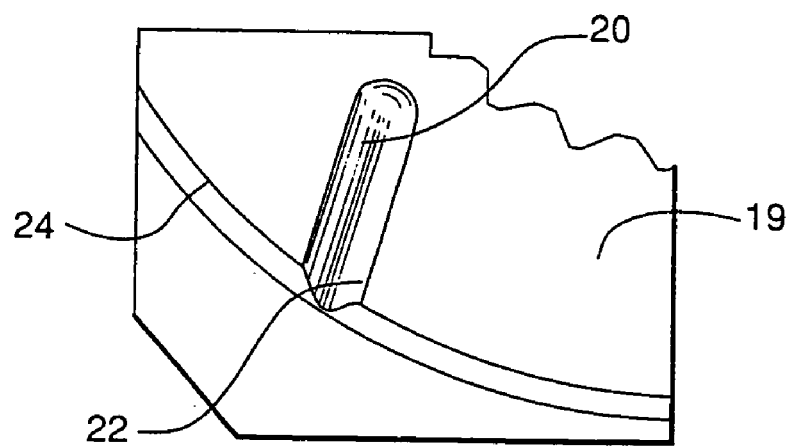
FIG. 2A is an enlarged perspective view of a portion of a first face of the race shown in FIG. 1.

Referring to FIG. 2A, first face 19 includes plural oil grooves 20 formed as depressions therein. First face 19 includes a chamfer 24 where it meets diametral face 12. Oil grooves 20 open into chamfer 24 at terminations 22. As explained below, first face preferably is formed as an upper surface in a die assembly during forging.

Figure 2B:
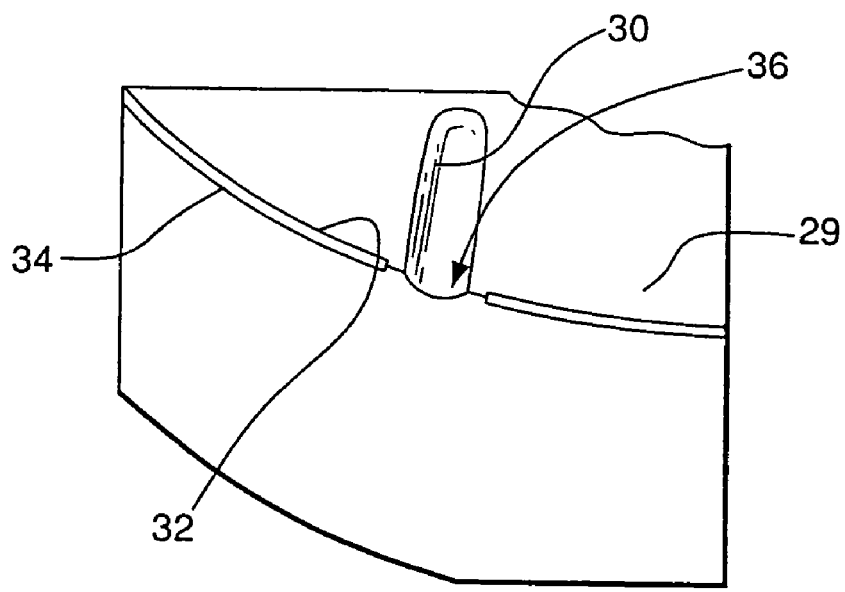
FIG. 2B is an enlarged perspective view of a portion of an opposing second face of the race shown in FIG. 1.

Referring to FIGS. 1 and 2B, second face 29 includes plural oil grooves 30 formed as depressions therein. Second face 29 includes a chamfer 34 where it meets diametral face 12. Chamfer 34 is spaced apart from the terminations 32 of at least some of oil grooves 30 such that non-chamfered surfaces 36 are disposed on each side of the terminations 32. The oil grooves 34, accordingly, open into diametral face 12.

Figure 3A:
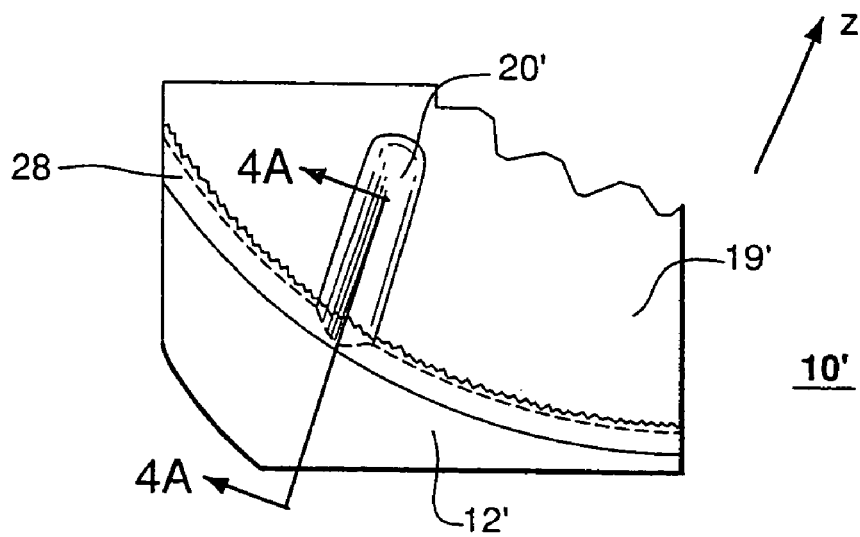
FIG. 3A is an enlarged perspective view a portion of a forging corresponding to the portion shown in FIG. 2A.
Figure 3B:
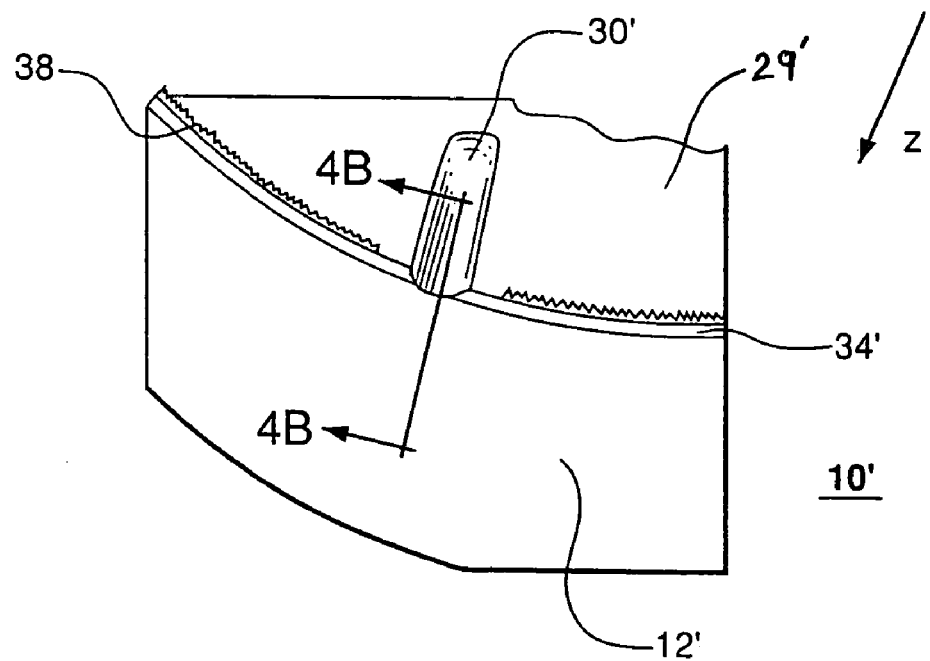
FIG. 3B is an enlarged perspective view of a forging corresponding to the portion of the race shown in FIG. 2B.
Figure 4A:
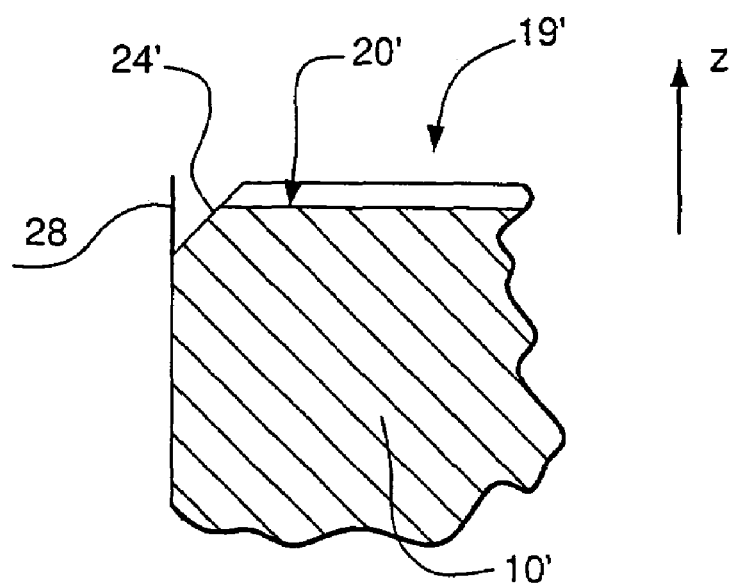
FIG. 4A is an enlarged sectional view of a portion of the forging shown in FIG. 3A.

Because race 10 is formed via a powder metallurgy forging process or the like, FIGS. 3A and 3B illustrate the race after forging and prior to grinding or other finishing processes. The reference numerals appended with a prime designation indicate the structure in a state after forging and before grinding, polishing, and other processing. In this regard, FIG. 3A, which shows the same portion of the race as shown in FIG. 2A, shows first face 19' having oil grooves 20'. FIGS. 3A and 3B illustrate flash, which is metal remnants squeezed from joints or cracks of the die assembly during the forging process. Flash 28 extends upwardly (that is, in the positive z direction) such that, preferably, the outer diameter of flash 28 is coextensive or has the same magnitude as the outer diameter of diametral surface 12', as best shown in cross sectional FIG. 4A.

Figure 4B:
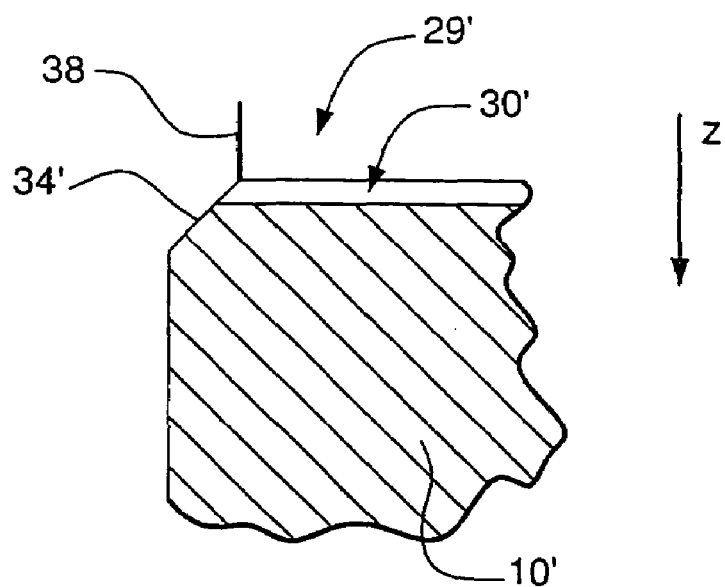
FIG. 4B is an enlarged sectional view of a portion of the forging shown in FIG. 3B.

FIG. 3B shows the same portion of the race shown in FIG. 2B such that second face 29' includes oil grooves 30'. Flash 38 extends downwardly (that is, in the negative Z direction, but upwardly as oriented in FIG. 3B) from face 29' such that the diameter of flash 38 has approximately the same magnitude as the inner diameter of chamfer 34', as best shown in cross sectional FIG. 4B.

Because diametral face 12' typically undergoes conventional grinding after forging, commonly referred to as "OD grinding," flash 28 disposed on or having approximately the same diameter as to diametral face 12' may be removed during such OD grinding process without special grinding or finishing processes. Because faces 19' and 29' typically undergo conventional grinding after forging, commonly referred to as "face grinding," flash 38 may be removed during such face grinding process without special grinding or finishing processes. For example, extensive grinding or similar processing of the chamfer may be eliminated or diminished by orienting the flash such that conventional OD grinding and face grinding remove it.

Figure 5:
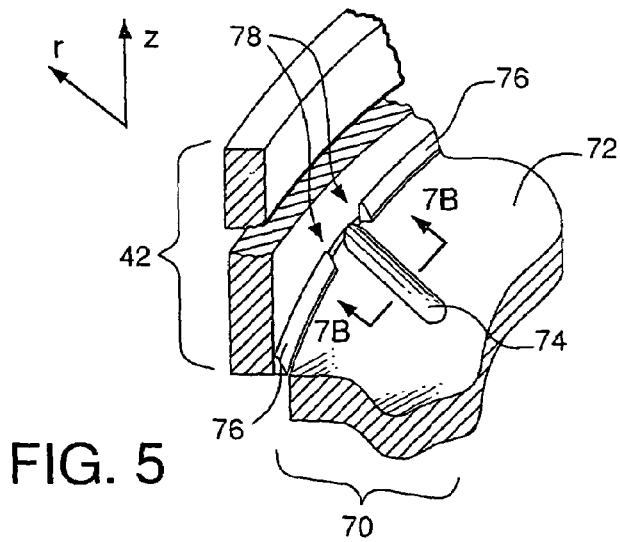
FIG. 5 is a perspective, sectional view of a portion of the die assembly used for forming the forging, with the preform removed for clarity.

A forge assembly includes a die 42, an upper punch 50, and a lower punch 70 for receiving a sintered part and forging it to produce forged inner race 10'. FIG. 5 illustrates an embodiment of die 42 and lower punch 70. Die 42 includes a circumferential or substantially cylindrical sidewall and a chamfering tool 76 disposed on a lower portion of the sidewall. Chamfering tool 76 preferably is circumferentially discontinuous such that it forms gaps 78 therein.

Figure 7A:
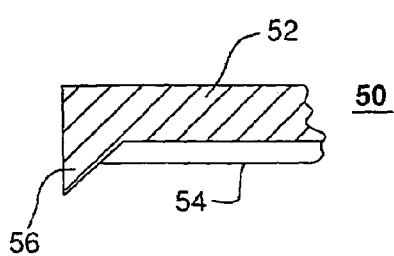
FIG. 7A is a generally tangential sectional view of a portion of the upper punch taken through lines 7A-7A in FIG. 6A.
Figure 6A:
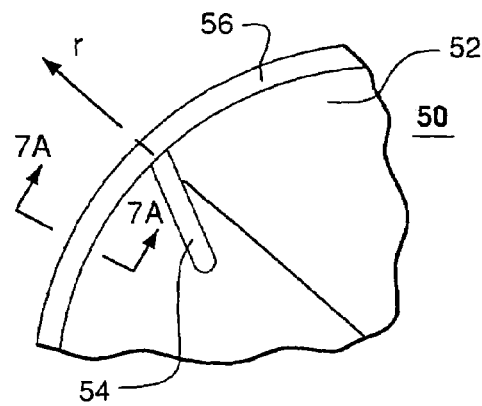
FIG. 6A is a plan view of an underside of an upper punch of the die assembly.

As shown in FIGS. 6A and 7A, upper punch 50 includes a planar body 52, which preferably is moveable relative to die 42, groove tooling 54 extending downward (that is, in the negative z direction) from planar body 52, and chamfer tooling 56 having a substantially triangular shape (in transverse cross section). Preferably, groove tooling 54 and chamfer tooling 56 merge together such that no flash forms there between.

Figure 7B:
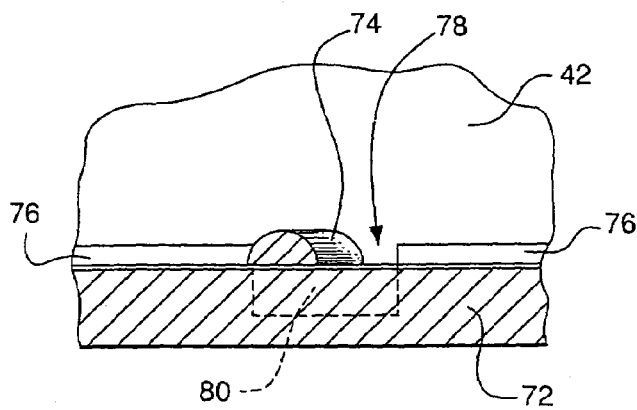
FIG. 7B is a generally radial sectional view of a portion of the lower punch and die taken through lines 7B-7B in FIG. 5.
Figure 6B:
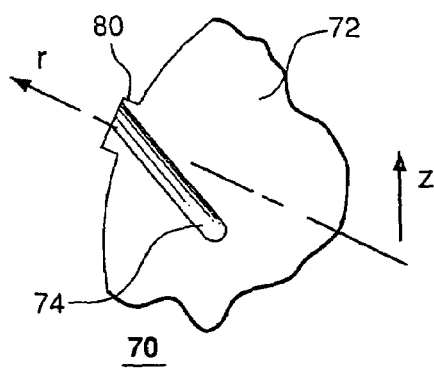
FIG. 6B is a plan view of a lower punch of the die assembly shown in FIG. 5.

As shown in FIGS. 5, 6B, and 7B, lower punch 70 includes a planar body 72, groove tooling 74 extending upwardly (that is, in the positive Z direction) from body 72, and teeth 80, which have an upper, working surface that is co-planar with the upper, working surface of planar body 72. Teeth 80 extending radially outwardly such that an outside diameter of each tooth 80 is greater than the outside diameter of planar body 72. Teeth 80 are inserted into gaps 78 of die 42. Preferably, there is a tooth 80 disposed at the termination 32 of each lower oil groove 39.

Flash 28 on the upper portion of race 10' (that is, corresponding to first face 19') is formed between the diametral surface of upper punch 50 and the inner surface of die 42 during forging. Accordingly, flash 28 has an outer diameter similar to that of diametral surface 12', because it is formed by the inner surface of die 42, as explained more fully above. Flash 38 on the lower portion of race 10' (that is, corresponding to second face 29') is formed between the outer diametral surface of lower punch 70 and the inner surface of die 42. Because the split between die 42 and lower punch 70 is disposed in the radially inboard side of chamfer tool 76, flash 38 is disposed at approximately the inner circumference of chamfer 34.

The method of forming inner race 10 comprises pressing a desired mix of powder, comprising metal, to form a green part or preform. Preferably, the preform is formed without oil grooves and without chamfers between the diametral surface and the side faces. The preform is sintered in an oven according to conventional sintering techniques. The operating parameters of the pressing and sintering steps may vary according to the particular characteristics desired in the size, configuration, chemical properties, and mechanical properties of the final product, as will be understood by persons familiar with such process and/or properties and attributes.

After sintering, the sintered part is forged in the die assembly described herein. Typically, after upper punch 50 and lower punch 70 are brought together in the forging process, lower punch 70 is extended above die 42 and forged inner race 10' is pushed off of lower punch 70. Such removal is facilitated by disposing the chamfer tooling 76 on die 42, as distinguished from lower punch 70. After forging, the preferably without the need for unconventional or hand grinding of the chamfers 24 and 34.

The present invention is illustrated with respect to a preferred embodiment of a structure, and the equipment and process for making such structure. The present invention, however, is not limited to the structure, equipment, or processes disclosed herein. Rather, the present invention encompasses numerous variations. For example, the particular orientation and configuration of the die or forging assembly is not meant to be limiting unless expressly set forth in the claims. The orientation, quantity, and spacing of the oil grooves and teeth are merely for illustrative purposes. The die, upper punch components, and lower punch components are shown schematically, and the actual configuration will be clear to persons familiar with the subject matter of the claims.

What is claimed:

1. A method for forming an oil groove in a face surface of a race, including the steps of:
   a) providing the race preform comprising an outer diametral surface and opposing first and second faces extending radially inwardly from the outer diametral surface;
   b) providing a die assembly comprising:
      a die including a circumferential sidewall and an inwardly extending, arcuate lower chamfer tool formed on a lower portion of said die for forming a chamfer between an outer diametral surface and a lower face of the race preform, the lower chamfer tool including gaps in its circumference such that the lower chamfer tool is discontinuous;
      a lower punch including oil groove tools extending upwardly thereon for forming oil grooves in the second face of the race and teeth extending radially outwardly and insertable into the gaps in the lower chamfer tool; and
      an upper punch disposed opposite said lower punch.
   c) disposing the race preform in said die assembly between said upper punch and said lower punch; and
   d) forging the race preform in the die between the punches such that oil grooves are formed in the second face of the race.

2. The method of claim 1 wherein the upper punch includes (i) an upper chamfer tool circumferentially disposed thereon for forming a chamfer between the outer diametral surface and the first face of the race and (ii) oil groove tools formed thereon such that the forging step forms oil grooves in the first face of the race.

3. The method of claim 2 wherein the upper oil groove tools merge into said upper chamfer tool.

4. The method of claim 2 wherein flash formed during the forging step extends upwardly from the diametral surface at the first face and downwardly from an interior diameter of the chamfer at the second surface.

5. The method of claim 4 further comprising an outside diameter grinding operation and a surface grinding operation after the forging step, said grinding operations removing said flash.

6. The method of claim 5 wherein the flash at the first face has an outside diameter that is substantially equal in magnitude to the outside diameter of the diametral surface and the flash at the second face has a diameter that is substantially equal in magnitude to an inner diameter of the chamfer proximate the second face.

7. The method of claim 1 wherein the oil groove tooling of the lower punch extends outwardly to proximate an inside surface of the die, whereby, after removal of flash from the forging, the second oil grooves open onto the diametral surface of the race.

8. The method of claim 7 wherein the oil groove tooling of the lower punch is spaced apart from the lower chamfer tool such that the teeth and die form an interruption in the chamfer of the race forging.

9. The method of claim 1 wherein the providing step a) includes pressing powder to form a green race and sintering the green race to form the race preform.

10. The method of claim 9 wherein the race preform is formed without said oil grooves.

11. The method of claim 1 wherein said forging step including sliding the race from the lower punch, whereby said lower chamfer tooling being formed on the die facilitates said sliding.

12. The method of claim 1 wherein the race is an inner race of a torque converter one-way clutch.

13. The method of claim 1 wherein the outer diametral surface forms a cylinder.

14. The method of claim 1 wherein the first face is parallel to the second face.

15. A die assembly for forming a race preform into a forging, said die assembly including:
   a die including a circumferential sidewall and an inwardly extending, arcuate lower chamfer tool formed on a lower portion of said die for forming a chamfer between an outer diametral surface and a lower face of the race preform, the lower chamfer tool including gaps in its circumference such that the lower chamfer tool is discontinuous;
   a lower punch including oil groove tools extending upwardly thereon for forming oil grooves in the second face of the race and teeth extending radially outwardly and insertable into the gaps in the lower chamfer tool; and
   an upper punch disposed opposite said lower punch.

16. The assembly of claim 15 wherein the upper punch includes (i) an upper chamfer tool circumferentially disposed thereon for forming a chamfer between the outer diametral surface and the first face of the race and (ii) oil groove tools formed thereon such that the forging step forms oil grooves in the first face of the race.

17. The assembly of claim 16 wherein the upper oil groove tools merge into said upper chamfer tool.

18. The assembly of claim 15 whereby said lower chamfer tooling being formed on the die facilitates sliding of the forging from the lower chamfer tool.

19. The assembly of claim 16 wherein gaps are formed between said upper punch and said die and said lower punch and said die, whereby flash is formed in said gaps during forging.

20. The assembly of claim 19 wherein the flash at the upper punch has an outside diameter that is substantially equal in magnitude to the inside diameter of the die and the flash at the lower punch face has a diameter that is substantially equal in magnitude to an inner diameter of the lower chamfer tool, whereby an outside diameter grinding operation and a surface grinding operation remove said flash.

21. The assembly of claim 15 wherein the oil groove tooling of the lower punch extends outwardly to proximate an inside surface of the die, whereby, after removal of flash from the forging, the oil grooves open onto the diametral surface of the race.

22. The assembly of claim 21 wherein the oil groove tooling of the lower punch is spaced apart from the lower chamfer tool such that the teeth and die form an interruption in the chamfer of the race forging.

23. The assembly of claim 15 wherein an inner surface of the die forms a cylinder.

24. The assembly of claim 15 wherein planar surfaces of the upper punch and the lower punch are substantially parallel.

* * * * *